United States Patent
Ueno

(10) Patent No.: US 11,954,566 B2
(45) Date of Patent: Apr. 9, 2024

(54) DATA COLLECTION SYSTEM FOR MACHINE LEARNING AND A METHOD FOR COLLECTING DATA

(71) Applicant: OKUMA CORPORATION, Niwa-Gun (JP)

(72) Inventor: Hiroshi Ueno, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 529 days.

(21) Appl. No.: 16/875,045

(22) Filed: May 15, 2020

(65) Prior Publication Data
US 2020/0380414 A1 Dec. 3, 2020

(30) Foreign Application Priority Data
May 28, 2019 (JP) .................. 2019-099605

(51) Int. Cl.
*G06N 20/00* (2019.01)
*G05B 19/00* (2006.01)
*G05B 19/18* (2006.01)

(52) U.S. Cl.
CPC ............. *G06N 20/00* (2019.01); *G05B 19/00* (2013.01); *G05B 19/18* (2013.01)

(58) Field of Classification Search
CPC ........ G06N 20/00; G05B 19/00; G05B 19/18; G06K 9/6267; G06K 9/6256; G06F 18/24; G06F 18/214
See application file for complete search history.

(56) References Cited

U.S. PATENT DOCUMENTS 10,803,398 B2    10/2020  Yokono et al.
2012/0284212 A1* 11/2012  Lin .................. G06N 20/00
                                              706/12
(Continued)

FOREIGN PATENT DOCUMENTS

JP        4339769 B2      10/2009
JP    2009-282686 A1      12/2009
(Continued)

OTHER PUBLICATIONS

Feuz, Sandro and Carbune, Victor, "Ranking and automatic selection of machine learning models Abstract", Technical Disclosure Commons, (Dec. 13, 2017). (Year: 2017).*

(Continued)

*Primary Examiner* — Vu Le
*Assistant Examiner* — Tracy Mangialaschi
(74) *Attorney, Agent, or Firm* — BURR PATENT LAW, PLLC

(57) ABSTRACT

A data collection system includes a classification model storing unit, a model delivery unit, a classification result storing unit, an optimum model recommendation unit, and a teacher data recording unit. The model delivery unit delivers a classification model to the user environment. The classification result storing unit classifies each of the classification models on the classification model storing unit using data with a label transmitted from the user environment as an input. The classification result storing unit stores a classification result including at least one of classification correctness or a percentage of correct answers for each input data. The optimum model recommendation unit presents an appropriate classification model for the input data based on the classification result for each of the classification models. The teacher data recording unit records the input data as teacher data or test data of the classification model.

5 Claims, 1 Drawing Sheet

(56) References Cited

U.S. PATENT DOCUMENTS

2015/0120624 A1* 4/2015 Yokono ................ G06V 10/776
  706/12
2020/0327134 A1* 10/2020 Freed .................... G06F 16/288

FOREIGN PATENT DOCUMENTS

| JP | 2015-087903 A | 5/2015 |
| JP | 6231944 B2 | 11/2017 |
| JP | 6358401 B1 | 7/2018 |

OTHER PUBLICATIONS

Japanese Office Action (with English translation), Japanese Application No. 2019-099605, dated Nov. 22, 2022 (8 pages).

* cited by examiner

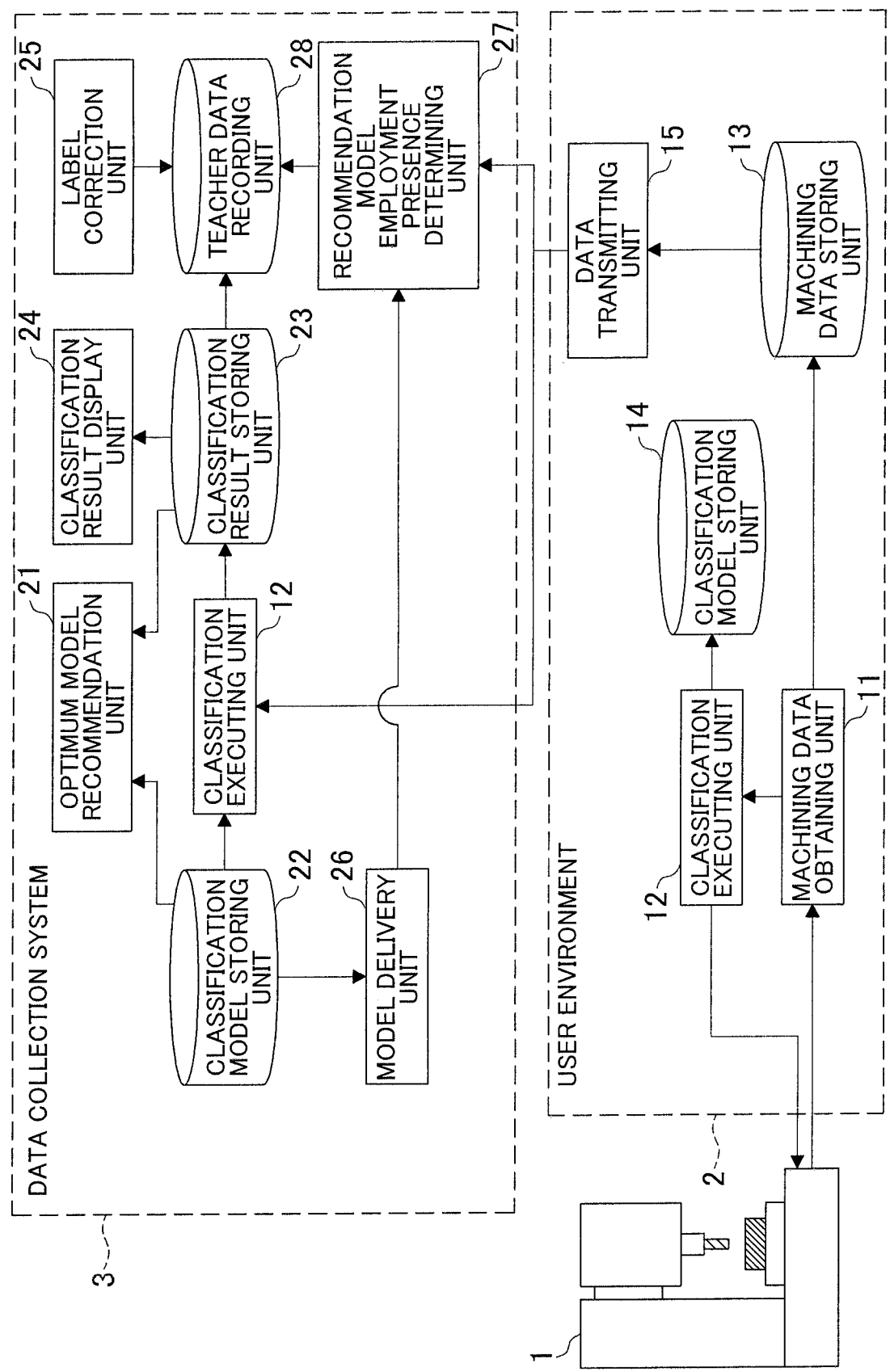

DATA COLLECTION SYSTEM FOR MACHINE LEARNING AND A METHOD FOR COLLECTING DATA

BACKGROUND OF THE INVENTION

This application claims the benefit of Japanese Patent Application Number 2019-099605 filed on May 28, 2019, the entirety of which is incorporated by reference.

TECHNICAL FIELD OF THE INVENTION

The disclosure relates to a collection system and a collecting method for teacher data or test data necessary for machine learning.

DESCRIPTION OF RELATED ART

As one of the machine learning techniques, there is a supervised learning technique as a method that accepts an input of data as a determination target, and determines and outputs a type (a label) of a content of the data. In the technique, a considerable number of pairs of data and its label are preliminarily prepared as teacher data, and learning is performed such that a model outputs labels that correspond to the data. Accordingly, when the label that pairs with the data is not accurately assigned, a model that makes an erroneous determination is learned, and therefore, the model to be obtained has a low determination performance. While on the other hand, there is an unsupervised learning technique that does not need the teacher data, it is preferred that there be test data for evaluation to which a correct label is assigned in order to determine correctness during the performance evaluation.

In the machine learning, many pieces of data are necessary in order to learn models. When a label is assigned to data, it is ideally preferred that a person of experience carefully scrutinizes and determines a label to be assigned after determination criteria are standardized. However, in reality, since a resource is limited, it is impossible to completely eliminate an assignment failure of label (mixing in of inaccurate label) caused by, for example, cases where a label is assigned in an uncertain state and where a person without experience assigns a label. Accordingly, it is a large task how to achieve a check for mixing in incorrect teacher data.

Collecting data itself also requires a labor, and it needs a lot of manpower in order to collect a large amount of data. Therefore, how to obtain many contributors is also a problem.

As described above, in creating a learning model high in determination performance, a large amount of teacher data and high-quality teacher data are indispensable, and it is important to obtain both of them at the same time.

Japanese Patent No. 6231944 discloses a technique to reduce an effect of low-quality teacher data (to which an inappropriate label is assigned) on a learning model. In the technique, the effect is reduced by making a model for each user as a supplier of teacher data, and indexing differences between features of the respective users to perform learning so as to decrease a contribution rate of a user having a different feature from the other users.

Similarly, a technique in JP-A-2009-282686 discloses a technique that reduces an effect of a label of low reliability. In the technique, reliable teacher data is selected and separated in advance. For data other than the reliable teacher data, a degree of reliability is set based on a difference from the reliable data and a consistency of a label with the reliable data to prevent learning accuracy from deteriorating.

The learning model created in the machine learning often has its content black boxed, and when a plurality of learning models are provided, a model user may find it hard to determine which model should be used for himself/herself. Therefore, Japanese Patent No. 4339769 discloses a technique in which a system stores a plurality of learning models, and an optimum learning model is selected based on a difference between a prediction amount and an actual amount by each diagnostic model. In other words, it is a technique that evaluates the difference between the prediction amount and the actual amount in order to select an appropriate model.

Japanese Patent No. 6358401 discloses a technique of an alarm prediction. A prediction model generating unit makes a prediction model from event information (data) from a user that indicates a failure of a machine unit or the like. A prediction model evaluating unit calculates and evaluates a prediction omission rate and an erroneous prediction rate of the prediction model. A display control unit displays the evaluated information. Thus, the user is notified of an accuracy of a prediction model.

With the technique according to Japanese Patent No. 6231944, it is possible to reduce an effect of a user who makes more errors in assigning labels than the others, such as a user with less experience. However, label assigning errors made by a person of experience incidentally occur in some rare cases, and the assigning errors are possibly mixed in.

With the technique according to JP-A-2009-282686, while the teacher data is weighted by a tendency of the data, there also is a case where, even a data tendency seems to have a similarity, a label assignor assigns a different label on purpose from his/her experience. With the method of the technique, in the above-described case, learning may be contrary to an intention of the label assignor.

In the case of the technique in Japanese Patent No. 4339769, when an inappropriate label is assigned to actual data to be compared, a model performance cannot be accurately evaluated.

In the case of the technique in Japanese Patent No. 6358401, while an evaluation of the prediction model is possible, data transmitted from a user is limited to encoding and usage for extracting an event row. Therefore, low-quality data may mix in the teacher data or the test data to cause the user not to select an appropriate prediction model.

Therefore, it is an object of the disclosure to provide a machine learning data collection system and a collecting method that reduce the likelihood that low-quality data, to which an inappropriate label is assigned, is mixed in collecting teacher data or test data used for machine learning, which ensures efficiently collecting a large amount of high-quality data. More specifically, not only excluding low-quality data, but also establishing an environment where the high-quality data is likely to be collected to solve the above-described problems.

SUMMARY OF THE INVENTION

In order to achieve the above-described object, a data collection system for machine learning according to a first aspect of the disclosure is provided for collecting teacher data or test data of a classification model that classifies a class by machine learning. The data collection system includes a classification model storing unit, a model delivery unit, a classification result storing unit, an optimum model recommendation unit, and a teacher data recording unit. The classification model storing unit locates a plurality of learned classification models to be used in a user environment. The model delivery unit delivers the classification model to the user environment. The classification result storing unit classifies each of the classification models on the classification model storing unit using data with a label transmitted from the user environment as an input. The classification result storing unit stores a classification result including at least one of classification correctness or a percentage of correct answers for each input data. The optimum model recommendation unit presents an appropriate classification model for the input data based on the classification result for each of the classification models. The teacher data recording unit records the input data as teacher data or test data of the classification model.

In the disclosure according to a second aspect of the disclosure, which is in the first aspect of the disclosure, the data collection system for machine learning further includes a recommendation model employment presence determining unit that detects whether the classification model presented by the optimum model recommendation unit is employed or not in the user environment. When the recommendation model employment presence determining unit has determined that the classification model presented by the optimum model recommendation unit is employed, the input data is recorded in the teacher data recording unit.

In the disclosure according to a third aspect of the disclosure, which is in the first or second aspect of the disclosure, while the classification result storing unit stores classification correctness for each of the input data as a classification result, the data collection system further includes a classification result display unit and a label correction unit. The classification result display unit presents the classification correctness to a user. The label correction unit corrects a label of the input data. Input data on which the correction result by the label correction unit is reflected is recorded in the teacher data recording unit.

In order to achieve the above-described object, a data collecting method for machine learning according to a fourth aspect of the disclosure is provided for collecting teacher data or test data of a classification model that classifies a class by machine learning. The data collecting method includes a data classification step, an optimum model recommendation step, and a teacher data recording step. The data classification step is a step of classifying each of a plurality of recorded, learned classification models using data with a label transmitted from a user environment as input data. The optimum model recommendation step is a step of presenting an appropriate classification model for the input data based on the classification result for each of the classification models. The teacher data recording step is a step of recording the input data as teacher data or test data of the classification model.

With the disclosure, in collecting the teacher data or the test data used for machine learning, a large amount of high-quality data can be efficiently collected while reducing the likelihood that low-quality data, to which an inappropriate label is assigned, is mixed in. The learning model made in the machine learning is hard for the user to determine which model should be used. Therefore, the user has a motivation to use a system that recommends a model in order to appropriately select the model that meets his or her application. In order for the system to return a reliable result, appropriate input data is necessary. Therefore, when using the system, the user is expected to upload data after scrutinizing the data and an assigned label in advance. That is, the model user selects data to which a label with a high accuracy is assigned for his or her own benefit to obtain the optimum model. Accordingly, using the pieces of data as the teacher data ensures lowering the likelihood that data to which a label is assigned with an uncertain sense is mixed into the teacher data, thereby ensuring establishing a better classification model. Even in unsupervised learning, an evaluation result that uses test data to which a correct answer is appropriately assigned can be used as an index, thereby similarly ensuring establishing and recommending a model appropriate for a user.

In other words, with the disclosure, a user can be encouraged to select and transmit the data to which a high-quality label is assigned, thereby ensuring further efficiently and easily collecting truly high-quality data. High-quality teacher data in accordance with a feeling of the user can be collected without distorting the determination (the label) of the user unreasonably affected by features of the data. Furthermore, the fact that a classification model appropriate for the user can be selected motivates to transmit data, thereby ensuring easily and continuously collecting high-quality data.

In particular, with the disclosure according to the second aspect, in addition to the above-described effects, a reliability of the teacher data can be further enhanced. Among the users who use the system, some users use the system with a trial sense. Determining whether the model recommended by the system is actually employed by a user or not ensures determining if the user has a trial purpose or an actual selective purpose. Excluding the data input for the trial purposes ensures reducing the likelihood that low-quality data, to which an inappropriate label is assigned, is mixed in with more certainty.

In particular, with the disclosure according to the third aspect, in addition to the above-described effects, displaying the classification result of the classification model stored in the system ensures that the user can confirm which input data has caused a misdiagnosis. Confirming if there is an assignment error of label on the misdiagnosed data again and correcting if there is an error ensure selecting an appropriate classification model with further accuracy. As a result, the reliability of the input data recorded as the teacher data is also improved, thereby ensuring obtaining further high-quality teacher data.

BRIEF DESCRIPTION OF THE DRAWINGS

FIG. 1 is a block configuration diagram of a machine tool.

DETAILED DESCRIPTION OF THE INVENTION

The following describes embodiments of the disclosure based on the drawings.

As an example, a description will be made using a data collection system for machine learning (hereinafter, simply referred to as a "data collection system") 3 that determines a presence/absence and a type of an abnormality when a workpiece is machined with a machine tool 1.

A user environment 2, contained in the machine tool 1 or coupled through a network and the like, determines the presence/absence of an abnormality, and the result is transmitted back to the machine tool 1 to execute an appropriate control, such as halting the machining. A signal (e.g. a load, a vibration) obtained from the machine tool 1 during the machining is collected by machining data obtaining unit 11 and is appropriately recorded in machining data storing unit 13, and is transmitted to classification executing unit 12. The classification executing unit 12 uses learned classification models stored in classification model storing unit 14 to determine whether the machining of the machine tool 1 is normal or not, and transmits the result to the machine tool 1.

How accurate the abnormality of the machining can be determined depends on a performance of the learned classification model to be used. In order to further accurately classify normality/abnormality or classify what sort of the abnormality it is, a classification model high in performance needs to be used. Accurately or sensitively detecting a machining abnormality ensures reducing a damage of a tool and a failure of a work material in advance. Therefore, a user desires a better classification model.

For the classification model used in the disclosure, a model created in machine learning with supervised learning is assumed. A label that should be determined (e.g. normality/abnormality or a type of abnormality) is assigned to data, and the data is provided to a learning machine for a preliminary learning. Thus, a classification model that estimates a label for unknown input data can be obtained. While an individual user possibly creates the above-described learned classification model, collecting a required amount by a user unit is often difficult, since the machine learning generally requires many types and a large amount of learning data. Therefore, there sometimes is provided a configuration in which a machine tool manufacturer, a third party, and the like widely collect data to establish and distribute the learned classification models to users. In the case, since a variety of users use the models, the prepared models have a variety of types and characteristics. Generally, an application range and determination accuracy are often traded off, and therefore, the user has to select a model that meets the application and the required level for himself/herself. Therefore, in the disclosure, a configuration in which a model supplier side recommends a model appropriate for a user is assumed.

A user transmits machining data of a case that he or she would like a diagnosis or a similar case using data transmitting unit 15. The data to be transmitted can be appropriately selected from, for example, data recorded in the machining data storing unit 13.

In the data collection system 3 as the model supplier side, various classification models that are already generated are accumulated in classification model storing unit 22. The data transmitted from the data transmitting unit 15 in a user side is provided to a part of or all of the learned classification models accumulated in the classification model storing unit 22, and is classified by the classification executing unit 12 (a data classification step). For an individual classification process itself, a mechanism similar to that in the user environment 2 is used.

Correctness of the classification and percentages of correct answers are each calculated to be stored in classification result storing unit 23 and to be displayed on classification result display unit 24. Simultaneously, a model considered to be high in suitability to the transmitted data, such as a model with a high percentage of correct answers, is presented to the user with optimum model recommendation unit 21 (an optimum model recommendation step). As recommendation criteria, respective percentages of correct answers for normal data or abnormal data, a percentage of correct answers for the data weighted as data that the user focuses on, and the like can be appropriately used besides the percentage of correct answers for the entirety.

The user can determine whether to employ the presented model or not based on the results of the optimum model recommendation unit 21 and the classification result display unit 24. When the model performance is satisfactory and is to be used, the model is obtained from model delivery unit 26, and stored in the classification model storing unit 14 and applied to the classification executing unit 12. Thus, the model can be used for the classification. A side of the data collection system 3 determines whether a recommendation model is employed or not at recommendation model employment presence determining unit 27. The determination is based on information, such as a presence/absence of delivery from the model delivery unit 26 and a presence/absence of application to the classification executing unit 12.

When it is determined that the user is applied with the recommendation model, the transmitted data from the data transmitting unit 15 in the user side is recorded and accumulated in teacher data recording unit 28 (a teacher data recording step).

When the user does not satisfy with the performance of the model presented by the optimum model recommendation unit 21, a result displayed by the classification result display unit 24 can be used. The result is used in order to confirm if there is an error in the input data (the data transmitted by the data transmitting unit 15) used for the calculation of the model performance. When an error is found in the input data as the result of the confirmation, the user can correct a label of the data using label correction unit 25. For a method for correcting a label, a method, such as after selecting the data to be corrected with a list of data displayed on a screen, inputting a correct label again, can be appropriately used. When the label is corrected, the correction result is appropriately reflected on the data, and when the data is recorded in the teacher data recording unit 28, the presence/absence, the content, and the like of the correction can be reflected and recorded.

The data collection system 3 and the data collecting method in the above-described configuration includes the classification model storing unit 22, the model delivery unit 26, the classification result storing unit 23, the optimum model recommendation unit 21, and the teacher data recording unit 28. The classification model storing unit 22 locates a plurality of the learned classification models to be used in the user environment 2. The model delivery unit 26 delivers the classification model to the user environment 2. The classification result storing unit 23 classifies using the data with a label transmitted from the user environment 2 as an input. The classification result storing unit 23 stores the classification result including classification correctness and a percentage of correct answers for each input data. The optimum model recommendation unit 21 presents an appropriate classification model for the input data based on the classification result for each of the classification models. The teacher data recording unit 28 records the input data as the teacher data or the test data of the classification model. Thus, a user can be encouraged to select and transmit the data to which a high-quality label is assigned, thereby ensuring further efficiently and easily collecting truly high-quality data. High-quality teacher data in accordance with a feeling of the user can be collected without distorting the determination (the label) of the user unreasonably affected by features of the data. Furthermore, the fact that a classification model appropriate for the user can be selected motivates to transmit data, thereby ensuring easily and continuously collecting high-quality data.

In particular, the recommendation model employment presence determining unit 27 is provided for detecting whether the classification model presented by the optimum model recommendation unit 21 is employed or not in the user environment 2. When the recommendation model employment presence determining unit 27 has determined that the classification model presented by the optimum model recommendation unit 21 is employed, the input data is recorded in the teacher data recording unit 28. Therefore, a reliability of the teacher data can be further enhanced. Among the users who use the system, some users use the system with a trial sense. Determining whether the model recommended by the system is actually employed by a user or not ensures determining if the user has a trial purpose or an actual selective purpose. Excluding the data input for the trial purposes ensures avoiding the data to which an inaccurate label is assigned from mixing in with more certainty.

The classification result display unit 24 that presents classification correctness to the user and the label correction unit 25 that corrects the label of the input data are provided. The input data in which the correction result by the label correction unit 25 is reflected is recorded in the teacher data recording unit 28. Therefore, the user can confirm which input data has a misdiagnosis. Confirming if there is an assignment error of label on the misdiagnosed data again and correcting if there is an error ensure selecting an appropriate classification model with further accuracy. As a result, the reliability of the input data recorded as the teacher data is also improved, thereby ensuring obtaining further high-quality teacher data.

The data collection system 3 may be installed on a cloud, or may be installed as on-premises upon additionally establishing a route for distributing the learned model or collecting the teacher data. The classification result stored by the classification result storing unit can also be at least any one of classification correctness or a percentage of correct answers.

While the optimum model recommendation unit, the classification result display unit, and the label correction unit are ones confirmed and operated by the user in the user environment, they are not necessarily disposed in the user environment.

For example, in the case of a machine tool, an NC apparatus serves as the user environment and a server via a network serves as the data collection system. The server side performs a process based on the data retrieved from the NC apparatus. Unit can be disposed for displaying the processed information on the server side so as to make the processed information correctable. Conversely, the optimum model recommendation unit, the classification result display unit, and the label correction unit can be disposed in the NC apparatus side, and it is also possible to display on another personal computer (PC) or the like via a server and make it correctable.

On the other hand, the user environment is not necessarily disposed in the NC apparatus side, and the data collection system may be in any side of the user side or the manufacturer side. For example, the user environment may serve as a server (PC) that receives information from the NC apparatus, and the data collection system may serve as a server (including PC, cloud) in the manufacturer side.

The description has been made with the example of the supervised learning in the embodiment, in the case of unsupervised learning, such as clustering, the data transmitted by the data transmitting unit can be used as test data for performance evaluation, not as the teacher data. More specifically, the teacher data in the embodiment can be used for a classification model in the unsupervised learning by reading the teacher data in the embodiment as the test data.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A data collection system for machine learning that collects teacher data or test data of a classification model that classifies a class by machine learning, the data collection system comprising:

a classification model storing unit that locates a plurality of learned classification models to be used in a user environment;

a model delivery unit that delivers the classification model to the user environment;

a classification result storing unit that classifies each of the classification models on the classification model storing unit using data with a label transmitted from the user environment as an input data, the classification result storing unit storing a classification result including at least one of classification correctness or a percentage of correct answers for each input data;

a classification result display unit that presents the classification correctness to a user;

an optimum model recommendation unit that presents an appropriate classification model for the input data to the user environment based on the classification result for each of the classification models;

a recommendation model employment presence determining unit that detects whether the classification model presented by the optimum model recommendation unit is employed or not in the user environment;

a teacher data recording unit that records the input data as teacher data or test data of the classification model when the recommendation model employment presence determining unit has determined that the classification model presented by the optimum model recommendation unit is employed; and a label correctness unit that corrects a label of the input data, wherein input data on which the correction result of the label correctness unit is reflected is recorded in the teacher data recording unit;

wherein the user environment is contained in a machine tool;

the user environment including a machining data obtaining unit for obtaining data during processing by the machine tool;

a machining data storing unit for recording processing data collected by the machine data obtaining unit;

a classification model storing unit for storing a learned classification model for determining a presence or absence and type of abnormality; and a classification executing unit for determining the presence or absence of abnormality in processing of the machine tool using the learned classification model stored by the classification model storing unit;

wherein a determination result of the presence or absence of abnormality is transmitted to the machine tool to execute a control of machining by the machine tool; and wherein the processing data recorded by the machining data storing unit is labeled and transmitted to the data collection system to be classified.

2. A data collection system for machine learning that collects teacher data or test data of a classification model that classifies a class by machine learning, the data collection system comprising:
- a classification model storing unit that locates a plurality of learned classification models to be used in a user environment contained in a machine tool;
- the user environment including a machining data obtaining unit for obtaining data during processing by the machine tool;
- a machining data storing unit for recording processing data collected by the machine data obtaining unit;
- a classification model storing unit for storing a learned classification model for determining a presence or absence and type of abnormality; and
- a classification executing unit for determining the presence or absence of abnormality in processing of the machine tool using the learned classification model stored by the classification model storing unit;
- wherein a determination result of the presence or absence of abnormality is transmitted to the machine tool to execute a control of machining by the machine tool; and
- wherein the processing data recorded by the machining data storing unit is labeled and transmitted to the data collection system to be classified;
- a model delivery unit that delivers the classification model to the user environment;
- a classification result storing unit that classifies each of the classification models on the classification model storing unit using data with a label transmitted from the user environment as an input, the classification result storing unit storing a classification result including at least one of classification correctness or a percentage of correct answers for each input data;
- a classification result display unit that presents the classification correctness to a user while the classification result storing unit stores classification correctness for each of the input data as a classification result;
- an optimum model recommendation unit that presents an appropriate classification model for the input data to the user environment based on the classification result for each of the classification models; and
- a teacher data recording unit that records the input data as teacher data or test data of the classification model;
- a label correction unit that corrects a label of the input data, wherein
- input data on which the correction result by the label correction unit is reflected is recorded in the teacher data recording unit.

3. A data collecting method for machine learning that collects teacher data or test data of a classification model that classifies a class by machine learning, the data collecting method comprising:
- classifying each of a plurality of recorded, learned classification models using data with a label transmitted from a user environment as input data;
- presenting an appropriate classification model for the input data to the user environment based on a classification result for each of the classification models, and storing a classification result including at least one of classification correctness or a percentage of correct answers for each input data;
- presenting the classification correctness to a user;
- detecting whether the classification model is employed or not in the user environment;
- recording the input data as teacher data or test data of the classification model when the classification model is employed in the user environment; and
- correcting a label of the input data, wherein input data on which the correctness result is reflected is recorded;
- wherein the user environment is contained in a machine tool;
- the user environment including a machining data obtaining unit for obtaining data during processing by the machine tool;
- a machining data storing unit for recording processing data collected by the machine data obtaining unit;
- a classification model storing unit for storing a learned classification model for determining a presence or absence and type of abnormality; and
- a classification executing unit for determining the presence or absence of abnormality in processing of the machine tool using the learned classification model stored by the classification model storing unit;
- wherein a determination result of the presence or absence of abnormality is transmitted to the machine tool to execute a control of machining by the machine tool; and
- wherein the processing data recorded by the machining data storing unit is labeled and transmitted to the data collection system to be classified.

4. A data collection system for machine learning that collects teacher data or test data of a classification model that classifies a class by machine learning, the data collection system comprising:
- a classification model storing unit that locates a plurality of learned classification models to be used in a user environment contained in a machine tool;
- the user environment including a machining data obtaining unit for obtaining data during processing by the machine tool;
- a machining data storing unit for recording processing data collected by the machine data obtaining unit;
- a classification model storing unit for storing a learned classification model for determining a presence or absence and type of abnormality; and
- a classification executing unit for determining the presence or absence of abnormality in processing of the machine tool using the learned classification model stored by the classification model storing unit;
- wherein a determination result of the presence or absence of abnormality is transmitted to the machine tool to execute a control of machining by the machine tool; and
- wherein the processing data recorded by the machining data storing unit is labeled and transmitted to the data collection system to be classified;
- a model delivery unit that delivers the classification model to the user environment;
- a classification result storing unit that classifies each of the classification models on the classification model storing unit using data with a label transmitted from the user environment as an input data, the classification result storing unit storing a classification result including at least one of classification correctness or a percentage of correct answers for each input data;
- an optimum model recommendation unit that presents an appropriate classification model for the input data to the user environment based on the classification result for each of the classification models;

a recommendation model employment presence determining unit that detects whether the classification model presented by the optimum model recommendation unit is employed or not in the user environment; and a teacher data recording unit that records the input data as teacher data or test data of the classification model when the recommendation model employment presence determining unit has determined that the classification model presented by the optimum model recommendation unit is employed.

5. A data collecting method for machine learning that collects teacher data or test data of a classification model that classifies a class by machine learning, the data collecting method comprising:

classifying each of a plurality of recorded, learned classification models using data with a label transmitted from a user environment as input data;

presenting an appropriate classification model for the input data to the user environment based on a classification result for each of the classification models, and storing a classification result including a least one of classification correctness or a percentage of correct answers for each input data;

detecting whether the classification model is employed or not in the user environment; and recording the input data as teacher data or test data of the classification model when the classification model is employed in the user environment;

wherein the user environment is contained in a machine tool;

the user environment including a machining data obtaining unit for obtaining data during processing by the machine tool;

a machining data storing unit for recording processing data collected by the machine data obtaining unit;

a classification model storing unit for storing a learned classification model for determining a presence or absence and type of abnormality; and a classification executing unit for determining the presence or absence of abnormality in processing of the machine tool using the learned classification model stored by the classification model storing unit;

wherein a determination result of the presence or absence of abnormality is transmitted to the machine tool to execute a control of machining by the machine tool; and wherein the processing data recorded by the machining data storing unit is labeled and transmitted to the data collection system to be classified.

* * * * *